H. JEFFREY.
WRENCH.
APPLICATION FILED JUNE 13, 1908.
12,854. Reissued Sept. 15, 1908.
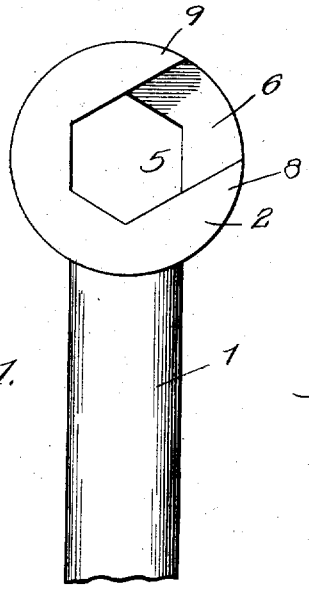
Fig. 1.
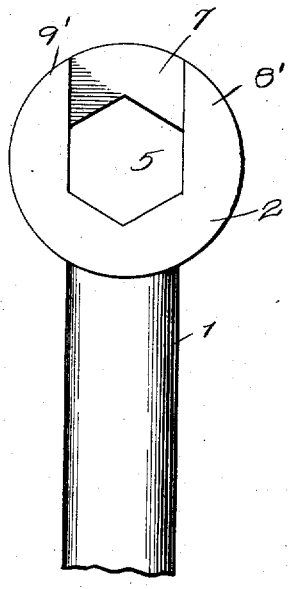
Fig. 2
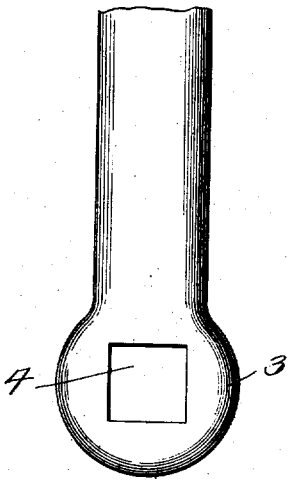
Fig. 3.
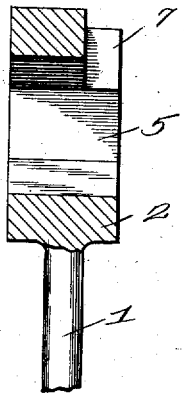
Witnesses
B. V. Bram.
N. E. Costello.
Inventor
Harry Jeffrey
By H. H. Bliss
Attorney
THE NORRIS PETERS CO., WASHINGTON, D. C.

UNITED STATES PATENT OFFICE.

HARRY JEFFREY, OF LOUISVILLE, KENTUCKY, ASSIGNOR TO THE OHIO MALLEABLE IRON COMPANY, OF COLUMBUS, OHIO, A CORPORATION OF OHIO.

WRENCH.

No. 12,854. Specification of Reissued Letters Patent. Reissued Sept. 15, 1908.

Original No. 873,437, dated December 10, 1907, Serial No. 357,453. Application for reissue filed June 13, 1908. Serial No. 438,439.

*To all whom it may concern:*

Be it known that I, HARRY JEFFREY, a citizen of the United States of America, residing at Louisville, in the county of Jefferson and State of Kentucky, have invented certain new and useful Improvements in Wrenches, of which the following is a specification, reference being had therein to the accompanying drawing.

This invention relates to a combined spanner and socket wrench formed of a single piece of metal, and has for its object to provide a wrench that can be easily and quickly placed upon a nut or bolt-head either by moving the wrench-head axially of the nut while in position of engagement or by moving it transversely of the axis, and which shall have a continuity of metal around the nut or bolthead, so that all of the parts subjected to strain shall be immovable and tied together, whereby great strength and durability are secured without increasing the thickness of the metal over that used in making the ordinary open-jaw solid wrenches.

Another object of this invention is to provide a spanner wrench that can be either used in connection with a square nut, hexagon nut or other nut having two parallel surfaces, the wrench being constructed to dispense with the plurality of spanner wrenches heretofore employed for various sizes of nuts.

A further object of this invention is to provide a simple and inexpensive spanner wrench that can be easily and quickly placed upon a nut to rotate the same, the wrench being constructed of a single piece of material formed to grip nuts of various configurations, and sizes.

With the above and other objects in view, which will more readily appear as the invention is better understood, the same consists in the novel construction, combination and arrangement of parts to be hereinafter more fully described and then specifically pointed out in the appended claims, and referring to the drawing forming part of this specification, like numerals of reference designate corresponding parts throughout the several views, in which:—

Figure 1 is a fragmentary front elevation of the wrench illustrating an entrance groove thereof disposed at an angle with relation to the handle of the wrench. Fig. 2 is a rear elevation of a portion of the wrench illustrating another entrance groove thereof alining with the handle of the wrench. Fig. 3 is a vertical sectional view of the same.

The wrench shown is constructed with a shank or handle 1 having enlarged heads 2 and 3, the head 2 constituting the upper end of the wrench. The head 3 is provided with a rectangular opening 4 to receive a nut similar in contour, while the head 2 is provided with a hexagon shaped opening 5 to receive a similarly shaped nut.

The front and rear sides of the head 2 are provided with entrance grooves, the groove 6 upon the front side of the head 2 being disposed at an angle with relation to the handle 3, the groove being approximately one-third the depth of the head 2 and having sides lying in a plane with two of the diametrically opposed angular sides of the opening 5. The groove 7 upon the opposite side of the head 2 is approximately one-third the depth of the head and has its sides alining with the vertically disposed sides of the opening 5.

From the novel arrangement of the entrance grooves 6 and 7 for a nut, it will be observed that the sides of said grooves form gripping surfaces for engaging a nut, and the wrench can take a more positive grip upon a nut by sliding the wrench over the nut and then moving the wrench inwardly until the nut engages in the opening 5 of the wrench.

The body part of the head (the part near the handle), is relatively thick, as noted, and the metal at the bottom of the groove 6 or the groove 7 is a relatively thin web integral with the two jaw-like side parts 8, 9 or 8′—9′. The web-like part consequently serves as a tie to effectually prevent the spreading or breaking of either of the jaws and greatly increases the strength and durability of the tool. At the same time the body part of the head 2 is no thicker than has been common in the art. The groove and web permit the tool to be used as a spanner wrench, and the aperture at 5 permits it to be used as a socket wrench when possible.

What I claim and desire to secure by Letters Patent, is:—

1. A wrench of the type set forth comprising a handle having formed integral therewith at one end thereof an enlarged head provided with a hexagonal-shaped opening, said head further having one face thereof formed with an angularly-disposed groove having two of the sides thereof alining in a plane with two oppositely-disposed walls of the said opening, said groove disposed permanently at an angle with respect to the handle and said head further having on the opposite face thereof a groove, the side walls of which aline with two opposite side walls of the opening, said last mentioned groove permanently extending in the direction in which the handle extends.

2. A wrench for engaging nuts and bolt-heads comprising a handle having formed integral therewith a head provided with an opening to receive nuts and bolt-heads, jaws having inner faces flush with the sides of the opening and integral with the handle and head adapted to slidably engage with the sides of nuts or bolt-heads in a direction transverse of their axes, and a bracing tie-web integral with both jaws, said web being thinner than the body part of the head along lines parallel to the axis of the aperture, substantially as set forth.

3. A wrench for polygonal nuts and bolt-heads comprising a handle, a head 2 integral with the handle and formed integrally with relatively thick jaws, and with a polygonal nut-receiving aperture or cavity at the inner ends of and flush with the inner faces of said jaws, and with a connecting tie-web integral with and thinner than the jaws, whereby the wrench can laterally engage with a nut and, while engaged, be moved transversely thereof, and whereby the jaws will be prevented from spreading under strain, all of said parts being formed in a single piece of metal, substantially as set forth.

4. A wrench comprising a handle having formed integral therewith a head provided with a nut-receiving opening extending through the head, said head having on one face a groove extending radially outward from said opening in one direction with the sides of the groove alining with the two opposite walls of the opening, and having on the other face a groove extending from the opening radially outward in another direction, said head having a single mass of metal integral with the handle and extending integrally around the nut-receiving opening, and said grooves permitting engagement of the head with the nuts at points radially outside of said opening, substantially as set forth.

5. A wrench comprising a handle having formed integrally therewith a head provided with a polygonal nut-receiving opening extending through the head and with a groove alining flush with two opposite sides of said opening and extending across one face of the head from the opening to the head periphery whereby two nut-engaging jaws are formed connected by a relatively thin strengthening web.

In testimony whereof I affix my signature in the presence of two witnesses.

HARRY JEFFREY.

Witnesses:
F. F. HOEFFLE,
CHAS. A. BEALL.